United States Patent
Seo et al.

(10) Patent No.: US 12,211,979 B2
(45) Date of Patent: Jan. 28, 2025

(54) METHOD FOR RECOVERING ACTIVE METAL OF LITHIUM SECONDARY BATTERY

(71) Applicant: SK INNOVATION CO., LTD., Seoul (KR)

(72) Inventors: Young Bin Seo, Daejeon (KR); Min Ji Sung, Daejeon (KR); Ji Min Kim, Daejeon (KR); Seung Ok Lee, Daejeon (KR); In Ae Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 18/246,095

(22) PCT Filed: Aug. 24, 2021

(86) PCT No.: PCT/KR2021/011249
§ 371 (c)(1),
(2) Date: Mar. 21, 2023

(87) PCT Pub. No.: WO2022/065702
PCT Pub. Date: Mar. 31, 2022

(65) Prior Publication Data
US 2023/0369670 A1   Nov. 16, 2023

(30) Foreign Application Priority Data
Sep. 22, 2020   (KR) .......... 10-2020-0122245

(51) Int. Cl.
*H01M 10/54* (2006.01)
*B01J 43/00* (2006.01)
(Continued)

(52) U.S. Cl.
CPC .......... *H01M 10/54* (2013.01); *B01J 43/00* (2013.01); *B01J 47/02* (2013.01); *B01J 49/50* (2017.01);
(Continued)

(58) Field of Classification Search
CPC .......... H01M 10/54; B01J 43/00; B01J 47/02; B01J 49/50; C01D 15/02; C01D 15/08;
(Continued)

(56) References Cited

U.S. PATENT DOCUMENTS 9,312,581 B2   4/2016 Laucournet et al.
2014/0037521 A1   2/2014 Stephen et al.

FOREIGN PATENT DOCUMENTS

CN   108866358 A * 11/2018 .............. C22B 3/24
JP   2009-269810 A   11/2009
(Continued)

OTHER PUBLICATIONS

Ferreira et al. "Hydrometallurgical separation of aluminum, cobalt, copper and lithium from spent Li-ion batteries" Journal of power sources 187 (2009) p. 238-246 (Year: 2009).*
(Continued)

*Primary Examiner* — Wayne A Langel
*Assistant Examiner* — Syed T Iqbal
(74) *Attorney, Agent, or Firm* — The PL Law Group, PLLC

(57) ABSTRACT

In a method for recovering active metals of a lithium secondary battery according to an embodiment, a cathode active material mixture is collected from the cathode of the lithium secondary battery, the cathode active material mixture is reduced by a reducing reaction to prepare a preliminary precursor mixture, an aqueous lithium precursor solution is formed from the preliminary precursor mixture, and an aluminum-containing material is removed from the aque-
(Continued)

ous lithium precursor solution with an aluminum removing resin.

20 Claims, 1 Drawing Sheet

(51) Int. Cl.

| | | |
|---|---|---|
| B01J 47/02 | (2017.01) | |
| B01J 49/50 | (2017.01) | |
| C01D 15/02 | (2006.01) | |
| C01D 15/08 | (2006.01) | |
| C01F 7/021 | (2022.01) | |
| C22B 1/00 | (2006.01) | |
| C22B 3/24 | (2006.01) | |
| C22B 5/14 | (2006.01) | |
| C22B 7/00 | (2006.01) | |
| C22B 21/00 | (2006.01) | |
| C22B 21/02 | (2006.01) | |
| C22B 26/12 | (2006.01) | |

(52) U.S. Cl.
CPC ............. *C01D 15/02* (2013.01); *C01D 15/08* (2013.01); *C01F 7/021* (2013.01); *C22B 1/005* (2013.01); *C22B 3/24* (2013.01); *C22B 5/14* (2013.01); *C22B 7/006* (2013.01); *C22B 21/0007* (2013.01); *C22B 21/0023* (2013.01); *C22B 21/02* (2013.01); *C22B 26/12* (2013.01)

(58) Field of Classification Search
CPC . C01F 7/021; C22B 1/005; C22B 3/24; C22B 5/14; C22B 7/006; C22B 21/0007; C22B 21/0023; C22B 21/02; C22B 26/12
See application file for complete search history.

(56) References Cited

FOREIGN PATENT DOCUMENTS

| | | |
|---|---|---|
| JP | 2009-270189 A | 11/2009 |
| JP | 2014-114470 A | 6/2014 |
| JP | 2015-185471 A | 10/2015 |
| JP | 2019-099874 A | 6/2019 |
| KR | 10-1271669 B1 | 6/2013 |
| KR | 10-2015-0002963 A | 1/2015 |
| KR | 10-2017-0061206 A | 6/2017 |
| KR | 10-2018-0042641 A | 4/2018 |
| KR | 10-2020238 B1 | 9/2019 |
| KR | 10-2020-0052735 A | 5/2020 |
| WO | WO 2019/199014 A1 | 10/2019 |
| WO | WO 2019/199015 A1 | 10/2019 |

OTHER PUBLICATIONS

Pindar et al. "Recycling of mixed discarded lithium-ion batteries via microwave processing route" Jan. 2020, Sustainable Materials and Technologies 25 e00157 (Year: 2020).*

Virolainen et al. "Removal of iron, aluminium, manganese and copper from leach solutions of lithium-ion battery waste using ion exchange" Hydrometallurgy 202 (2021) 105602 (Year: 2021).*

International Search Report for PCT/KR2021/011249 mailed on Nov. 26, 2021.

European Search Report For EP21872732.9 issued on Feb. 16, 2024 from European patent office in a counterpart European patent application.

* cited by examiner

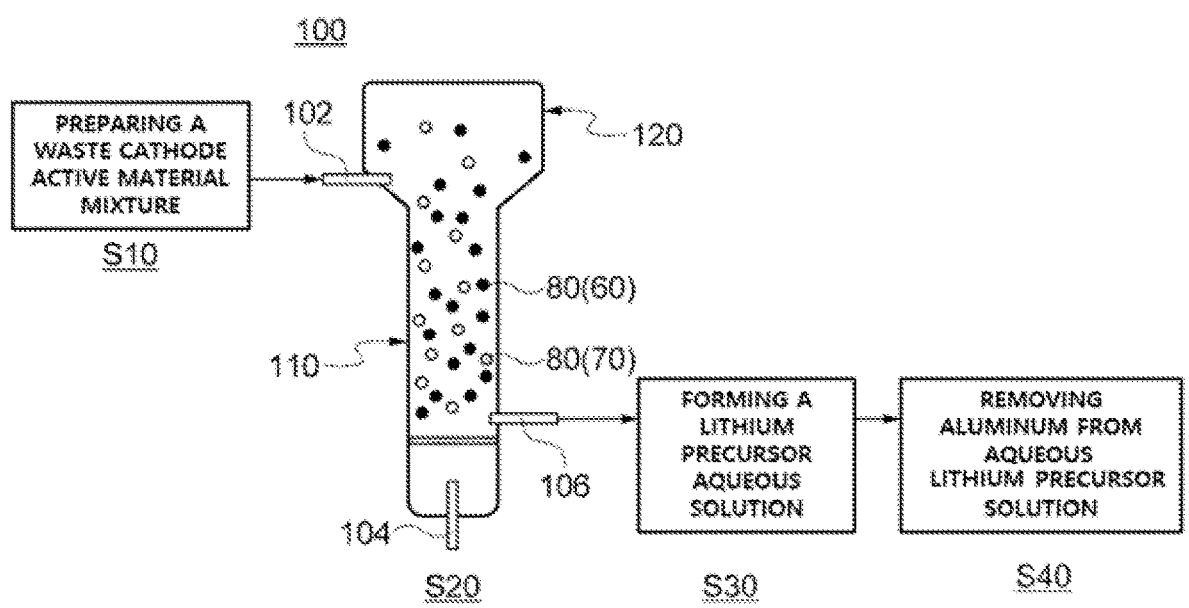

METHOD FOR RECOVERING ACTIVE METAL OF LITHIUM SECONDARY BATTERY

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/011249 filed on Aug. 24, 2021, which claims priority to the benefit of Korean Patent Application No. 10-2020-0122245 filed in the Korean Intellectual Property Office on Sep. 22, 2020, the entire contents of which are incorporated herein by reference.

BACKGROUND

1. Technical Field

The present invention relates to a method for recovering an active metal of a lithium secondary battery. More particularly, the present invention relates to a method for recovering an active metal from a cathode of a lithium secondary battery.

2. Background Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is actively developed and applied due to high operational voltage and energy density per unit weight, a high charging rate, a compact dimension, etc.

The lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

A lithium metal oxide may be used as a cathode active material for the lithium secondary battery. The lithium metal oxide may further contain a transition metal such as nickel, cobalt, manganese, etc.

The lithium metal oxide as the cathode active material may be prepared by reacting a lithium precursor and a nickel-cobalt-manganese (NCM) precursor containing nickel, cobalt and manganese.

As the above-mentioned high-cost valuable metals are used for the cathode active material, an excessive cost is required for manufacturing the cathode material. Additionally, as environment protection issues have recently been highlighted, a recycling method of the cathode active material is being researched. For the recycle of the cathode active material, a regeneration of the lithium precursor with high efficiency and purity is needed.

SUMMARY

According to an aspect of the present invention, there is provided a method for recovering an active metal of a lithium secondary battery with high efficiency and high purity.

A method for recovering an active metal of a lithium secondary battery according to one or more embodiments of the present invention includes collecting a cathode active material mixture from a cathode of a lithium secondary battery, preparing a preliminary precursor mixture by a reductive reaction of the cathode active material mixture, forming an aqueous lithium precursor solution from the preliminary precursor mixture, and removing an aluminum-containing material from the aqueous lithium precursor solution by using an aluminum removal resin.

In some embodiments, the aluminum removal resin may contain an amine group and a hydroxyl group.

In some embodiments, the aluminum removal resin may contain two or more hydroxyl groups.

In some embodiments, the aluminum removal resin may include an amphoteric resin.

In some embodiments, wherein the aluminum-containing material may include an aluminum hydroxide ion $(Al(OH)_4^-)$.

In some embodiments, the removing of the aluminum-containing material from the aqueous lithium precursor solution includes passing the aqueous lithium precursor solution through a column filled with the aluminum removal resin.

In some embodiments, wherein a ratio of a total volume of the aqueous lithium precursor solution to a volume of the aluminum removal resin may be in a range from 5 to 30.

In some embodiments, the method may further include, after the removing of the aluminum-containing material from the aqueous lithium precursor solution, adding an acid and a metal hydroxide to the aluminum removal resin to regenerate the aluminum removal resin.

In some embodiments, the reductive reaction may be performed in a powder state in a fluidized bed reactor.

In some embodiments, the preparing the preliminary precursor mixture may include supplying a reductive hydrogen gas into the fluidized bed reactor.

In some embodiments, the preliminary precursor mixture may include preliminary lithium precursor particles and transition metal-containing particles.

In some embodiments, the preliminary lithium precursor particles may include at least one of lithium hydroxide, lithium oxide or lithium carbonate.

In some embodiments, the transition metal-containing particles may include nickel, cobalt, manganese or an oxide thereof.

According to one or more exemplary embodiments, a method for recovering an active metal from a lithium secondary battery may include removing aluminum from an aqueous solution of a lithium precursor by using an aluminum removal resin. Accordingly, aluminum derived from a cathode current collector may be removed, and a recovery ratio and purity of the lithium precursor may be improved.

In one or more embodiments, aluminum in the aqueous solution of the lithium precursor may include an aluminum hydroxide ion $(Al(OH)^{4-})$ form, which may not be removed by a cation exchange resin, but may be effectively removed by the aluminum removal resin, effect.

Additionally, the cation-removing resin may also remove lithium ions to reduce the recovery ratio of lithium, but the aluminum removal resin may be used to prevent the reduction of the recovery ratio by suppressing the reduction of the lithium ions.

BRIEF DESCRIPTIONS OF THE DRAWINGS

Figure is a schematic flow diagram for describing a method for recovering an active metal of a lithium secondary battery in accordance with an exemplary embodiment.

DETAILED DESCRIPTION

One or more embodiments of the present invention provide a high-purity, high-yield method for recovering an active metal from a lithium secondary battery of a waste lithium secondary battery.

Hereinafter, embodiments of the present invention will be described in detail. However, since the present invention may be subject to various modification and may have various forms, specific embodiments are illustrated in the drawings and described in detail in the text. However, this is not intended to limit the present invention to the specific form disclosed herein, and should be understood to include all modifications, equivalents, or substitutes included in the spirit and scope of the present invention.

Unless defined otherwise, all terms used herein, including technical or scientific terms, have the same meaning as commonly understood by one of ordinary skill in the art to which the present invention belongs. Terms such as those defined in commonly used dictionaries should be interpreted as having a meaning consistent with the meaning in the context of the related art, and unless explicitly defined in this application, they are not interpreted in an ideal or excessively formal meaning.

As used herein, the term "precursor" is used to comprehensively refer to a compound including a specific metal to provide the specific metal included in an electrode active material.

Figure is a schematic flow diagram for describing a method for recovering an active metal of a lithium secondary battery in accordance with an exemplary embodiment.

Referring to Figure, a cathode active material mixture (e.g., a waste cathode active material mixture) may be collected from a cathode of a lithium secondary battery (e.g., in a step of S10).

The lithium secondary battery may include an electrode assembly including a cathode, an anode and a separation layer interposed between the cathode and the anode. The cathode and the anode may include a cathode active material layer and an anode active material layer coated on a cathode current collector and an anode current collector, respectively.

For example, the cathode active material included in the cathode active material layer may include an oxide containing lithium and a transition metal.

In some embodiments, the cathode active material may include a compound represented by Chemical Formula 1 below.

$$Li_xM1_aM2_bM3_cO_y$$ 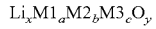    [Chemical Formula 1]

In Chemical Formula 1, M1, M2 and M3 may include a transition metal selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0<x\leq1.1$, $2\leq y\leq2.02$, $0<a<1$, $0<b<1$, $0<c<1$, and $0<a+b+c\leq1$.

In some embodiments, the cathode active material may be an NCM-based lithium oxide including nickel, cobalt and manganese.

The cathode may be recovered by separating the cathode from the lithium secondary battery. The cathode may be obtained from a waste lithium secondary battery, or may be a damaged or failure cathode in a manufacturing process.

The cathode may include the cathode current collector (e.g., aluminum (Al)) and the cathode active material layer as described above, and the cathode active material layer may further include a conductive material and a binder together with the cathode active material as described above.

The conductive material may include, e.g., a carbon-based material such as graphite, carbon black, graphene, carbon nanotube, etc. The binder may include a resin material, e.g., vinylidenefluoride-hexafluoropropylene copolymer (PVDF-co-HFP), polyvinylidenefluoride (PVDF), polyacrylonitrile, polymethylmethacrylate, etc.

In an exemplary embodiment, the recovered cathode may be pulverized to produce a cathode active material mixture. Accordingly, the cathode active material mixture may be prepared in a powder form. As described above, the cathode active material mixture may include a powder of the lithium-transition metal oxide, e.g., a powder of the NCM-based lithium oxide (e.g., Li(NCM)O$_2$).

The term "cathode active material mixture" used in the present application refers to a raw material that is input to a fluidizing process to be described later after the cathode current collector is substantially removed from the cathode. In an embodiment, the cathode active material mixture may include cathode active material particles such as the NCM-based lithium oxide. In an embodiment, the cathode active material mixture may include portions of components derived from the binder or the conductive material 80.

In one or more embodiments, the cathode active material mixture may be heat-treated before being pulverized. Impurities such as the conductive material and the binder included in the cathode active material mixture may be at least partially removed by the heat treatment, and the lithium-transition metal oxide may be introduced into the fluidized bed reactor with high purity.

The heat treatment temperature may be in a range from, e.g., about 100° C. to 500° C., preferably about 350 to 450° C. Within the above range, decomposition and damages of the lithium-transition metal oxide may be prevented while substantially removing the impurities.

In an example embodiment, a reductive reaction of the cathode active material mixture may be performed in the fluidized bed reactor 100 to form a preliminary precursor mixture 80 (e.g., in a step S20).

The term "fluidized bed reactor" used in this application refers to a reactor in which a fluid (gas or liquid) is passed through the injected cathode active material mixture to induce a fluidization of the cathode active material mixture.

In example embodiments, the cathode active material mixture may be injected into the fluidized bed reactor 100 through an inlet 102 located at an upper portion of the fluidized bed reactor 100.

In exemplary embodiments, the cathode active material mixture injected into the fluidized bed reactor 100 may form a preliminary precursor mixture 80 through a reductive reaction.

In some embodiments, the reductive reaction may be a hydrogen reductive reaction or a carbon reductive reaction.

In some embodiments, the hydrogen reductive reaction may be performed by injecting a reductive gas including hydrogen (H$_2$) into a reactor body 110 of the fluidized bed reactor 100 through a gas inlet 104.

For example, a mixed gas of hydrogen and a non-reactive gas may be injected as the reductive gas, a volume ratio of hydrogen to a total volume of the mixed gas may be in a range from 5 to 40%, and a volume ratio of the non-reactive gas may be in a range from 60 to 95%.

For example, the non-reactive gas may include at least one selected from the group consisting of helium (He), nitrogen ($N_2$), neon (Ne), argon (Ar), krypton (Kr) and xenon (Xe).

In some embodiments, an expansion tube 120 may be located at an upper portion of the fluidized bed reactor 100. The expansion tube 120 may reduce a flow rate of the reductive gas injected from a lower portion of the fluidized bed reactor 100 to prevent a leakage of the cathode active material mixture to an outside in a process of fluidizing the cathode active material mixture within an inside of the fluidized bed reactor 100.

In some embodiments, the reductive gas may be supplied from the lower portion of the fluidized bed reactor 100 to contact the cathode active material mixture so that the cathode active material mixture may react with the reductive gas while moving to the upper portion of the fluidized bed reactor 100 to be converted into preliminary precursor mixture 80.

The hydrogen reductive reaction in the reactor body 110 may be performed at a temperature in a range from about 400 to 700° C., preferably from 450 to 550° C. Within the reaction temperature range, the reductive reaction may be promoted without causing reaggregation or recombination of the preliminary lithium precursor particle 60 and transition metal-containing particle 70.

In some embodiments, the reductive reaction may be a carbon reductive reaction. In this case, the carbon reductive reaction may be performed by reacting the cathode active material mixture and a carbon-based compound. For example, the carbon-based compound may be added to the cathode active material mixture and heated to a temperature in a range from 400 to 800° C. to reduce carbon. For example, the carbon-based compound may include a carbon black powder or activated carbon.

In some embodiments, the lithium-transition metal oxide may be hydrogen-reduced or carbon-reduced to generate a preliminary lithium precursor including, e.g., lithium hydroxide (LiOH), lithium oxide (e.g., $Li_2O$), lithium carbonate ($Li_2CO_3$), and a transition metal or a transition metal oxide. For example, Ni, Co, NiO, CoO, and MnO may be produced together with lithium oxide by the reductive reaction.

For example, a preliminary precursor mixture 80 including preliminary lithium precursor particles 60 and transition metal-containing particles 70 (e.g., the transition metal or transition metal oxide) may be formed in the reactor body 110. The preliminary lithium precursor particles 60 may include, e.g., lithium hydroxide, lithium oxide, and/or lithium carbonate. From aspects of charge/discharge properties, life-span properties and high-temperature stability of the lithium secondary battery, the lithium precursor particles 60 may include lithium hydroxide.

In some embodiments, the preliminary precursor mixture 80 including the preliminary lithium precursor particles 60 and the transition metal-containing particles 70 may be collected through an outlet 106 connected to the reactor body 110.

In exemplary embodiments, an aqueous lithium precursor solution may be formed from the preliminary precursor mixture 80 (e.g., in a step S30).

For example, the lithium precursor may be collected by reacting the preliminary precursor mixture 80 formed from the above-described reductive reaction with a leaching liquid.

For example, the preliminary precursor mixture 80 may react with the leaching liquid to form the aqueous lithium precursor solution in which the lithium precursor particles 60 are dissolved and a precipitate of transition metal-containing particles 70.

For example, the preliminary lithium precursor particles 60 in the form of lithium oxide and lithium carbonate may react with the leaching liquid to form lithium hydroxide, and the formed lithium hydroxide may be dissolved in the leaching liquid.

In some embodiments, the leaching liquid may include water. In this case, the preliminary precursor mixture 80 may be washed with water. Through the water washing treatment, the preliminary precursor mixture 80 may react with water to form the aqueous lithium precursor solution in which lithium hydroxide is dissolved in water.

In some exemplary embodiments, the leaching liquid may further include dimethyl carbonate or diethyl carbonate.

For example, dimethyl carbonate or diethyl carbonate may promote the reaction between the preliminary precursor mixture 80 and water. Accordingly, the separation efficiency of the lithium precursor may be improved.

In some embodiments, the precipitate may include a slurry.

For example, the transition metal-containing particles 70 insoluble in the leaching liquid may be dispersed in the leaching liquid to form the slurry. Accordingly, the aqueous lithium precursor solution may be obtained by separating the slurry from the solution in which the lithium precursor is dissolved.

In some embodiments, the precipitated transition metal-containing particles 70 may be collected to form a transition metal precursor. For example, the transition metal-containing particles 70 may react with an acid solution to form the transition metal precursor.

In exemplary embodiments, sulfuric acid may be used as the acid solution. In this case, the transition metal precursor may include a transition metal sulfate. For example, the transition metal sulfate may include $NiSO_4$, $MnSO_4$ and $CoSO_4$.

In exemplary embodiments, an aluminum-containing material may be removed from the obtained aqueous lithium precursor solution by using an aluminum (Al) removal resin in the obtained aqueous lithium precursor solution (e.g., in a step S40).

For example, the lithium precursor may be formed substantially in the form of lithium hydroxide. Accordingly, the aqueous lithium precursor solution in which lithium hydroxide is dissolved in water may be a basic solution.

For example, the aqueous lithium precursor solution may include an aluminum-containing material derived from the cathode current collector included in the cathode. In this case, the aqueous lithium precursor solution may be a basic solution, and thus the aluminum-containing material may be dissolved in the aqueous lithium precursor solution in the form of aluminum hydroxide ions ($Al(OH)_4^-$). Accordingly, when the cation exchange resin is used, removal of the aluminum hydroxide ion, which is an anion, may not be implemented, and lithium ion ($Li^+$) may rather be removed, resulting in a reduction of a recovery ratio of the active metal.

According to exemplary embodiments of the present invention, the aluminum hydroxide ions may be removed by using the aluminum removal resin in the aqueous lithium precursor solution.

In some embodiments, the aluminum removal resin may include an amine group and a hydroxyl group. In this case, the hydroxyl group may be combined with an aluminum element of the aluminum hydroxide ion so that aluminum may be removed.

In some embodiments, the aluminum removal resin may include the amine group and two or more hydroxyl groups. In this case, two hydroxyl groups may be bonded to the aluminum element of the aluminum hydroxide ion, so that the aluminum element may be more stably bound to the resin and removed.

In some embodiments, the aluminum removal resin may include an amphoteric resin having two exchange groups of an acidic group and a basic group. Thus, for example, the aluminum hydroxide ion, which is an anion, may be selectively collected without collecting lithium cations, depending on a pH of a solution.

In some embodiments, the aluminum removal resin may be a resin containing a methylglucosylamine group. For example, AMBERLITE UP7530 from Dupont as a resin containing a methylglucosylamine group may be used as the aluminum removal resin.

For example, a volume of the aluminum removal resin required for aluminum removal may be varied depending on an aluminum content in the aqueous lithium precursor solution. In this case, a ratio of a total volume of the aqueous lithium precursor solution to a volume of the aluminum removal resin may be varied.

In some embodiments, the ratio of the total volume of the aqueous lithium precursor solution to the volume of the aluminum removal resin may be in a range from 5 to 30.

For example, when the above-mentioned volume ratio is satisfied, aluminum included in the aqueous lithium precursor solution can be sufficiently removed while preventing degradation of purity of a final lithium precursor recovery product due to an excessive addition of the resin.

Further, aluminum-containing materials included in the aqueous lithium precursor solution may be selectively removed through the above-described aluminum removal resin, and lithium ions may not be substantially removed. Thus, the recovery ratio of the active metal recovery process may be increased.

For example, in some embodiments, an aluminum content in the aqueous lithium precursor solution after the step S40 may be 20 ppm or less based on a total weight of the aqueous lithium precursor solution after the step S40. Accordingly, the aluminum content in the aqueous lithium precursor solution can be significantly reduced to increase the transition metal recovery ratio.

For example, a lithium removal ratio obtained by subtracting a lithium content with respect to a total weight of the aqueous lithium precursor solution after removing aluminum from a lithium content with respect to the total weight of the aqueous lithium precursor solution before adding the aluminum removal resin may be 0.08 wt % or less.

In some embodiments, the collecting of the aluminum-containing material from the aqueous lithium precursor solution may include passing the aqueous lithium precursor solution through a column packed with the aluminum removal resin.

For example, an aluminum removal column filled with the above-described aluminum removal resin may be prepared, and the aluminum-containing materials may be removed by passing the aqueous lithium precursor solution therethrough.

In some embodiments, the aluminum removal resin may be regenerated by adding an acid and a metal hydroxide to the used aluminum removal resin. For example, the acid may include at least one of sulfuric acid and hydrochloric acid. For example, a metal of the metal hydroxide may include at least one of lithium (Li), sodium (Na) and potassium (K). Accordingly, the aluminum removal resin can be reused, and the cost of recovering the lithium precursor can be reduced.

According to exemplary embodiments, the lithium precursor substantially consisting of lithium hydroxide may be obtained through a crystallization process of lithium hydroxide dissolved in the above-described aqueous lithium precursor solution from which aluminum is removed.

Hereinafter, experimental examples including specific examples and comparative examples are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

1 kg of a cathode material separated from a waste lithium secondary battery was heat treated at 450° C. for 1 hour. The heat-treated cathode material was cut into small units and pulverized through a milling to obtain a sample of a Li—Ni—Co—Mn oxide cathode active material mixture (step S10).

A mixed gas (reductive gas) of 20 vol % hydrogen/80 vol % nitrogen was injected into 0.2 kg of the sample of the collected cathode active material mixture through a gas inlet located at a bottom of a fluidized bed reactor for 4 hours to be fluidized in the fluidized bed reactor and reacted with hydrogen gas. Accordingly, a preliminary precursor mixture containing lithium hydroxide was formed. The temperature in the fluidized bed reactor was maintained at 460° C. (step S20).

Water and nitrogen gas were introduced into the preliminary precursor mixture collected from a reactor discharge port to form and collect a preliminary precursor mixture in a slurry state. Water was additionally added to the collected preliminary precursor mixture in the slurry state, and then washed with water to obtain an aqueous lithium precursor solution (step S30).

The aqueous lithium precursor solution and Dupont's AMBERLITE UP7530 resin were mixed in a volume ratio of 6:1 and stirred for 2 hours to obtain an impurity-free aqueous lithium precursor solution. Thereafter, a lithium precursor substantially consisting of lithium hydroxide was obtained through a crystallization process.

Example 2

An aqueous lithium precursor solution was obtained by the same method as that in Example 1, and, unlike Example 1, an aluminum removal column was used without adding AMBERLITE UP7530 resin to the aqueous lithium precursor solution.

Specifically, the same amount of AMBERLITE UP7530 resin as that in Example 1 was filled in the aluminum removal column made of SUS and having a volume of 75 ml, and then the aqueous lithium precursor solution was passed through the aluminum removal column, wherein a ratio of the total volume of the aqueous lithium precursor solution to the volume of the aluminum removal resin was 8, to obtain an aqueous lithium precursor solution from which aluminum was removed. Thereafter, a lithium precursor substantially consisting of lithium hydroxide was obtained through a crystallization process.

Example 3

An aqueous lithium precursor solution and a lithium precursor were obtained by the same method as that in Example 2, except that the ratio of the total volume of the aqueous lithium precursor solution to the volume of the aluminum removal resin was 15.

Example 4

An aqueous lithium precursor solution and a lithium precursor were obtained by the same method as that in Example 2, except the ratio of the total volume of the aqueous lithium precursor solution to the volume of the aluminum removal resin was 23.

Example 5

An aqueous lithium precursor solution and a lithium precursor were obtained by the same method as that in Example 2, except that the ratio of the total volume of the aqueous lithium precursor solution to the volume of the aluminum removal resin was 31.

Comparative Example 1

An aqueous lithium precursor solution was obtained by the same method as that in Example 1, and, unlike Example 1, the AMBERLITE UP7530 resin was not added.

Comparative Example 2

An aqueous lithium precursor solution was obtained by the same method as that in Example 1, and, unlike Example 1, the aqueous lithium precursor solution and a cation exchange resin were mixed in a volume ratio of 6:1 without adding AMBERLITE UP7530 resin.

Experimental Example (1) Measurement of lithium content in aqueous lithium precursor solution before and after aluminum removal The aqueous lithium precursor solution before and after the aluminum removal prepared according to the above-described Examples and Comparative Examples was measured by an ICP(Inductivity Coupled Plasma) method to measure lithium contents in the aqueous lithium precursor solution before and after the aluminum removal.

(2) Measurement of aluminum content in aqueous lithium precursor solution before and after aluminum removal The aqueous lithium precursor solution before and after the aluminum removal prepared according to the above-described Examples and Comparative Examples was measured by an ICP(Inductivity Coupled Plasma) method to measure aluminum contents of the aqueous lithium precursor solution before and after the aluminum removal.

The measurement results are shown in Table 1 below.

TABLE 1

| No. | ratio of total volume of aqueous lithium precursor solution to volume of aluminum removal resin | aluminum content before aluminum removal (ppm) | aluminum content after aluminum removal (ppm) | lithium content before aluminum removal (wt %) | lithium content after aluminum removal (wt %) |
|---|---|---|---|---|---|
| Example 1 | 6 | 110 | 10 | 0.44 | 0.38 |
| Example 2 | 8 | 110 | 10 | 1.07 | 1.05 |
| Example 3 | 15 | 110 | 10 | 1.07 | 1.06 |
| Example 4 | 23 | 110 | 28 | 1.07 | 1.06 |
| Example 5 | 31 | 110 | 76 | 1.07 | 1.06 |
| Comparative Example 1 | 0 | 110 | 110 | 0.44 | 0.44 |
| Comparative Example 2 | — | 110 | 110 | 0.44 | 0.24 |

Referring to Table 1, in Examples 1-5 where the aluminum removal resin (AMBERLITE UP7530 from DuPont) was added to the aqueous lithium precursor solution recovered through the reductive process and the water washing treatment, or the aqueous lithium precursor solution was passed through the column formed of the resin, a remarkable aluminum removal effect was realized compared to that from Comparative Examples 1 and 2 without the addition of the resin, and the reduction of the lithium recovery ratio was prevented by suppressing the reduction of the lithium content after the aluminum removal.

However, among Examples 1-5 and Comparative Examples 1 and 2 in which the aluminum content contained in the aqueous lithium precursor solution was 110 ppm, in Example 5 where the aqueous lithium precursor solution having a volume of 30 times or more the volume of the aluminum removal resin filled in the column, the aluminum removal effect was slightly lowered.

What is claimed is:
1. A method for recovering a cathode active metal of a lithium secondary battery, the method comprising:
    collecting a cathode material comprising a cathode active material mixture and an aluminum-containing material from a lithium secondary battery;
    preparing a preliminary precursor mixture from the cathode material by a reductive reaction of the cathode active material mixture;
    forming an aqueous lithium precursor solution from the preliminary precursor mixture;
    removing the aluminum-containing material from the aqueous lithium precursor solution by using an aluminum removal resin; and recovering the cathode active material from the aqueous lithium precursor solution from which the aluminum-containing material is removed, wherein the preparing of the preliminary precursor mixture comprises supplying a reductive gas into a fluidized bed reactor.

2. The method of claim 1, wherein the preliminary precursor mixture comprises preliminary lithium precursor particles and transition metal-containing particles.

3. The method of claim 2, wherein the preliminary lithium precursor particles comprise at least one of lithium hydroxide, lithium oxide, and lithium carbonate.

4. The method of claim 2, wherein the transition metal-containing particles comprise at least one of nickel, cobalt, manganese, and an oxide thereof.

5. The method of claim 1, wherein the reductive reaction is performed in a powder state in a fluidized bed reactor.

6. The method for recovering an active metal of a lithium secondary battery of claim 5, wherein the preparing of the preliminary precursor mixture comprises supplying a reductive hydrogen gas into the fluidized bed reactor.

7. The method of claim 1, wherein the forming of the aqueous lithium precursor solution comprises:
reacting the preliminary precursor mixture with a leaching liquid to form the aqueous lithium precursor solution.

8. The method of claim 7, wherein the leaching liquid comprises water and at least one of dimethyl carbonate and diethyl carbonate.

9. The method of claim 1, wherein the aluminum removal resin contains an amine group and a hydroxyl group.

10. The method of claim 1, wherein the aluminum removal resin contains two or more hydroxyl groups.

11. The method of claim 1, wherein the aluminum removal resin comprises an amphoteric resin.

12. The method of claim 1, wherein the aluminum-containing material includes an aluminum hydroxide ion ($Al(OH)_4^-$).

13. The method of claim 1, wherein the removing of the aluminum-containing material from the aqueous lithium precursor solution comprises passing the aqueous lithium precursor solution through a column filled with the aluminum removal resin.

14. The method of claim 1, wherein a ratio of a total volume of the aqueous lithium precursor solution to a volume of the aluminum removal resin is in a range from 5 to 30.

15. The method of claim 1, further comprising, after the removing of the aluminum-containing material from the aqueous lithium precursor solution, adding an acid and a metal hydroxide to the aluminum removal resin to regenerate the aluminum removal resin.

16. The method of claim 1, wherein the collecting of the cathode active material mixture comprises:
separating a cathode from the lithium secondary battery;
heat-treating the cathode; and
pulverizing the cathode to produce the cathode active material mixture in a powder form.

17. The method of claim 1, wherein the preparing of the preliminary precursor mixture comprises:
injecting the cathode active material mixture in a fluidized bed reactor having an expansion tube at an upper portion of the fluidized reactor through a first inlet to fluidize the cathode active material mixture; and
injecting a reductive gas into the fluidized bed reactor through a second inlet located lower than the first inlet for the reductive reaction between the reductive gas and the cathode active material mixture.

18. A method for recycling a cathode active metal from a waste or failure lithium secondary battery, the method comprising:
collecting a cathode material comprising a cathode active material mixture comprising an oxide containing lithium and a transition metal, and an aluminum-containing material, from the waste or failure lithium secondary battery;
preparing a preliminary precursor mixture comprising a preliminary lithium precursor particle and a transition metal-containing particle, from the cathode material, by a reductive reaction of the cathode active material mixture;
reacting the preliminary precursor mixture with a leaching liquid to form an aqueous lithium precursor solution;
removing the aluminum-containing material from the aqueous lithium precursor solution by using an aluminum removal resin, wherein the aluminum removal resin contains an amine group and at least one hydroxyl group; and
recovering the oxide containing lithium and the transition metal from the aqueous lithium precursor solution from which the aluminum-containing material is removed,
wherein the preparing of the preliminary precursor mixture comprises supplying a reductive gas into a fluidized bed reactor.

19. The method of claim 18, wherein the removing of the aluminum-containing material from the aqueous lithium precursor solution comprises passing the aqueous lithium precursor solution through a column filled with the aluminum removal resin.

20. The method of claim 19, wherein a ratio of a total volume of the aqueous lithium precursor solution to a volume of the aluminum removal resin is in a range from 5 to 30.

* * * * *